United States Patent
Chan (10) Patent No.: US 10,984,511 B1
(45) Date of Patent: Apr. 20, 2021

(54) CONTRAST-ADAPTIVE NORMALIZED PIXEL DIFFERENCE

(71) Applicant: QUALCOMM Incorporated, San Diego, CA (US)

(72) Inventor: Victor Chan, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 16/664,641

(22) Filed: Oct. 25, 2019

(51) Int. Cl.
*G06K 9/00* (2006.01)
*G06T 5/00* (2006.01)
*G06T 5/50* (2006.01)
*G06T 7/00* (2017.01)

(52) U.S. Cl.
CPC ........... *G06T 5/009* (2013.01); *G06T 5/50* (2013.01); *G06T 7/0002* (2013.01)

(58) Field of Classification Search
CPC ........... G06K 9/00288; G06K 9/00067; G06K 9/00221
See application file for complete search history.

(56) References Cited

U.S. PATENT DOCUMENTS

| | | | |
|---|---|---|---|
| 2006/0147096 A1* | 7/2006 | Lee | G06K 9/00067 382/124 |
| 2017/0004346 A1* | 1/2017 | Kim | G06K 9/00926 |
| 2020/0272808 A1* | 8/2020 | Wang | G06K 9/00248 |

OTHER PUBLICATIONS

A. A. Micheal and P. Geetha, "Multi-view face detection using Normalized Pixel Difference feature," 2017 International Conference on Communication and Signal Processing (ICCSP), Chennai, 2017, pp. 0988-0992, doi: 10.1109/ICCSP.2017.8286520. (Year: 2017).*
J. Li, D. Zhang, K. Zhang, K. Hu and L. Yang, "Real-time face detection during the night," 2017 4th International Conference on Systems and Informatics (ICSAI), Hangzhou, 2017, pp. 582-586, doi: 10.1109/ICSAI.2017.8248358. (Year: 2017).*
Dr. Kumari M.S., et al., "Efficient Modified Normalized Pixel Difference Face Detection Algorithm", International Journal for Research in Applied Science & Engineering Technology (IJRASET), ISSN: 2321-9653, vol. 5, Issue X, Oct. 2017, pp. 1046-1053.
Liao S., et al., "A Fast and Accurate Unconstrained Face Detector", IEEE Transactions on Pattern Analysis and Machine Intelligence, Sep. 7, 2015, 16 pages.

* cited by examiner

*Primary Examiner* — Li Liu
(74) *Attorney, Agent, or Firm* — MG-IP Law, P.C.

(57) ABSTRACT

Due to complexity constraints, most computer vision (CV) features are not suitable for certain applications such as low-power always-on applications. To address such issues, a contrast-adaptive normalized pixel difference (CA-NPD) is proposed. Unlike conventional NPD techniques, the CA-NPD smooths a metric surface, optimizes contrast discriminability, and enables context sensitive normalization.

30 Claims, 10 Drawing Sheets

*pixel brightness at x and y*

CONTRAST-ADAPTIVE NORMALIZED PIXEL DIFFERENCE

TECHNICAL FIELD

Various aspects described herein generally relate to computer vision (CV), and more particularly, to contrast-adaptive normalized pixel difference (CA-NPD).

BACKGROUND

Due to complexity constraints, most computer vision (CV) features are not suitable for certain applications such as low-power always-on applications. 2-D convolutions, scale invariant feature transform (SIFT), Harris-corners, difference of guassian (DoG), or histogram of oriented gradients (HoG) are simply too computational-intensive for low-power devices.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

An exemplary method is disclosed. The method comprises determining a pixel difference term based on first and second pixels of an image. The method also comprises determining a normalization term based on the first and second pixels. The method further comprises determining a normalized pixel difference (NPD) score by dividing the pixel difference term by the normalization term. The method yet further comprises detecting a feature of the image based on the NPD score, and outputting the detected feature of the image. The normalization term comprises one or both of a normalization floor threshold and a regional pixel distribution. The normalization floor threshold is such that the normalization term is equal to or greater than the normalization floor threshold. The regional pixel distribution represents a distribution of pixel values in a pixel region of the image. The pixel region encompasses the first and second pixels.

An exemplary apparatus is disclosed. The apparatus comprises a memory circuitry and a processor circuitry. The memory circuitry and the processor circuitry are configured to determine a pixel difference term based on first and second pixels of an image. The memory circuitry and the processor circuitry are also configured to determine a normalization term based on the first and second pixels. The memory circuitry and the processor circuitry are further configured to determine a normalized pixel difference (NPD) score by dividing the pixel difference term by the normalization term. The memory circuitry and the processor circuitry are yet further configured to detect a feature of the image based on the NPD score, and output the detected feature of the image. The normalization term comprises one or both of a normalization floor threshold and a regional pixel distribution. The normalization floor threshold is such that the normalization term is equal to or greater than the normalization floor threshold. The regional pixel distribution represents a distribution of pixel values in a pixel region of the image. The pixel region encompasses the first and second pixels.

Another exemplary apparatus is disclosed. The apparatus comprises means for determining a pixel difference term based on first and second pixels of an image. The apparatus also comprises means for determining a normalization term based on the first and second pixels. The apparatus further comprises means for determining a normalized pixel difference (NPD) score by dividing the pixel difference term by the normalization term. The apparatus yet further comprises means for detecting a feature of the image based on the NPD score, and means for outputting the detected feature of the image. The normalization term comprises one or both of a normalization floor threshold and a regional pixel distribution. The normalization floor threshold is such that the normalization term is equal to or greater than the normalization floor threshold. The regional pixel distribution represents a distribution of pixel values in a pixel region of the image. The pixel region encompasses the first and second pixels.

An exemplary non-transitory computer-readable medium storing computer-executable instructions for an apparatus is disclosed. The computer-executable instructions comprise one or more instructions causing the apparatus to determine a pixel difference term based on first and second pixels of an image. The computer-executable instructions also comprise one or more instructions causing the apparatus to determine a normalization term based on the first and second pixels. The computer-executable instructions further comprise one or more instructions causing the apparatus to determine a normalized pixel difference (NPD) score by dividing the pixel difference term by the normalization term. The computer-executable instructions yet further comprise one or more instructions causing the apparatus to detect a feature of the image based on the NPD score, and output the detected feature of the image. The normalization term comprises one or both of a normalization floor threshold and a regional pixel distribution. The normalization floor threshold is such that the normalization term is equal to or greater than the normalization floor threshold. The regional pixel distribution represents a distribution of pixel values in a pixel region of the image. The pixel region encompasses the first and second pixels.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

Figure 1:
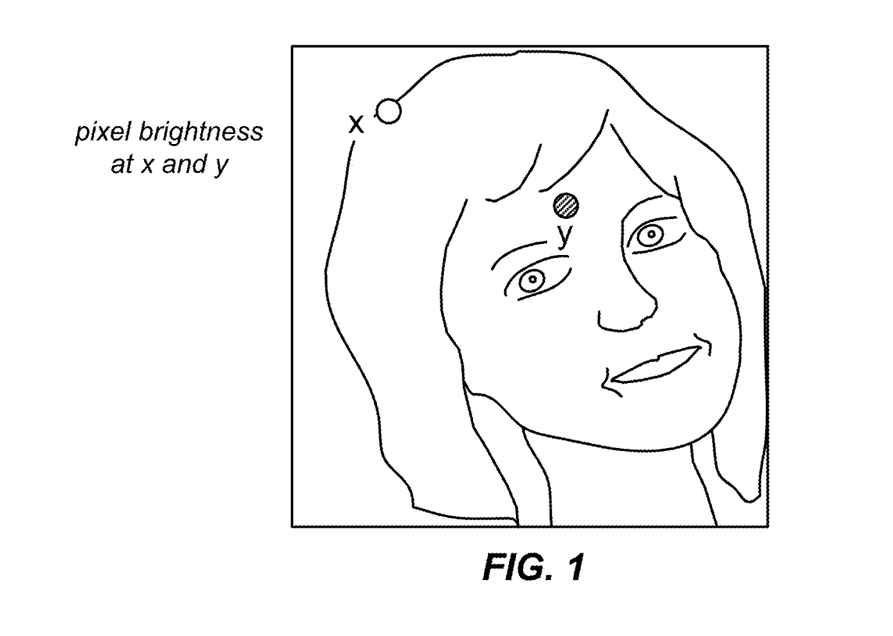
FIG. 1 illustrates an example use of a conventional normalized pixel difference (NPD) technique.

It is indicated above that in computer vision, there are low-complexity features that may be suitable in low-power applications. An example is the normalized pixel difference (NPD). FIG. 1 illustrates an example use of the conventional NPD. In the image of FIG. 1, two pixels x and y are chosen to extract a feature of the image, in which x and y represent brightness values of the pixels. The pixel values are processed as follows:

$$f(x, y) = \frac{x - y}{x + y} \quad (1)$$

In equation (1), the numerator x−y is the pixel difference term and the denominator x+y is the pixel sum term used as the normalization term. Also, f(x, y) may be referred to as the NPD score. The conventional NPD can be used to detect features in an image such as faces. The conventional NPD has several desirable characteristics. It is scale invariant. That is, the conventional NPD will work even when the image is stretched and/or compressed. Another desirable characteristic is that the conventional NPD has a flexible aspect ratio. For example, it is not limited by the reach and quantization of 3×3 pixel grid in the local binary pattern (LBP) technique. Further, the conventional NPD is occlusion tolerant, i.e., it is not affected by missing data between targeted two pixels. Other desirable features include blur tolerance and low complexity. Given its low complexity, NPD has relatively good performance.

Figure 2:
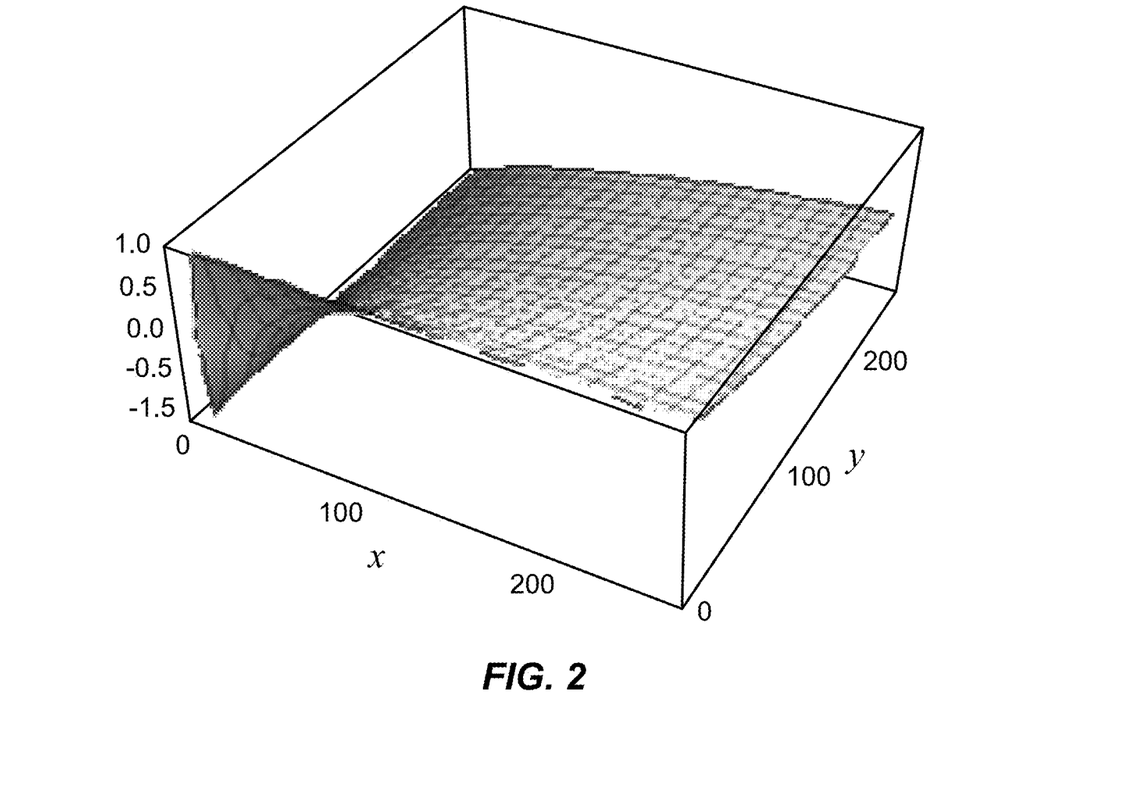
FIG. 2 illustrates a scoring surface associated with the conventional NPD technique.

However, the conventional NPD does have its limitations. One such limitation is that it has discontinuous metrics at dark pixels, e.g., at pixel values near zero. FIG. 2 illustrates a scoring surface associated with the conventional NPD. In FIG. 2, it is assumed that the pixel values of each of the pixels x and y ranges between 0 and 255. Then according to equation (1), the NPD score f(x, y) ranges between a minimum of −1 to a maximum of +1. Note the following:

f(0,0)=0 (assume that divide by zero is avoided),
f(1,0)=1, and
f(0,1)=−1.

It is seen that a minimal brightness change (e.g., 1 out of 255) can lead to a maximum change in the NPD score, i.e., from the min score to the max score. To state it another way, a minimum perturbation in the brightness change can lead to a maximum change in the NPD score. Such disproportionate scoring change is not desirable, since NPD scores from different images will be used for comparison Another limitation is that the conventional NPD lacks dynamic range near boundaries. In Table 1, NPD scores are provided for x (horizontal) and y (vertical) pixel values ranging between 0 and 6. Note that when the first pixel value is zero (i.e., x=0), the NPD score is always the minimum (−1.0). Conversely, when the second pixel value is zero (i.e., y=0), the NPD score is always the maximum (1.0), irrespective of the contrast difference between the two pixels.

TABLE 1

| (NPD score vs. pixel values) | | | | | | | |
|---|---|---|---|---|---|---|---|
| (x, y) | 0 | 1 | 2 | 3 | 4 | 5 | 6 |
| 0 | 0.0 | 1.0 | 1.0 | 1.0 | 1.0 | 1.0 | 1.0 |
| 1 | −1.0 | 0.0 | 0.33 | 0.5 | 0.6 | 0.67 | 0.71 |
| 2 | −1.0 | −0.33 | 0.0 | 0.2 | 0.33 | 0.43 | 0.5 |

TABLE 1-continued (NPD score vs. pixel values)

| (x, y) | 0 | 1 | 2 | 3 | 4 | 5 | 6 |
|---|---|---|---|---|---|---|---|
| 3 | −1.0 | −0.5 | −0.2 | 0.0 | 0.14 | 0.25 | 0.33 |
| 4 | −1.0 | −0.6 | −0.33 | −0.14 | 0.0 | 0.11 | 0.2 |
| 5 | −1.0 | −0.67 | −0.43 | −0.25 | −0.11 | 0.0 | 0.09 |
| 6 | −1.0 | −0.71 | −0.5 | −0.33 | −0.2 | −0.09 | 0.0 |

Figure 3:
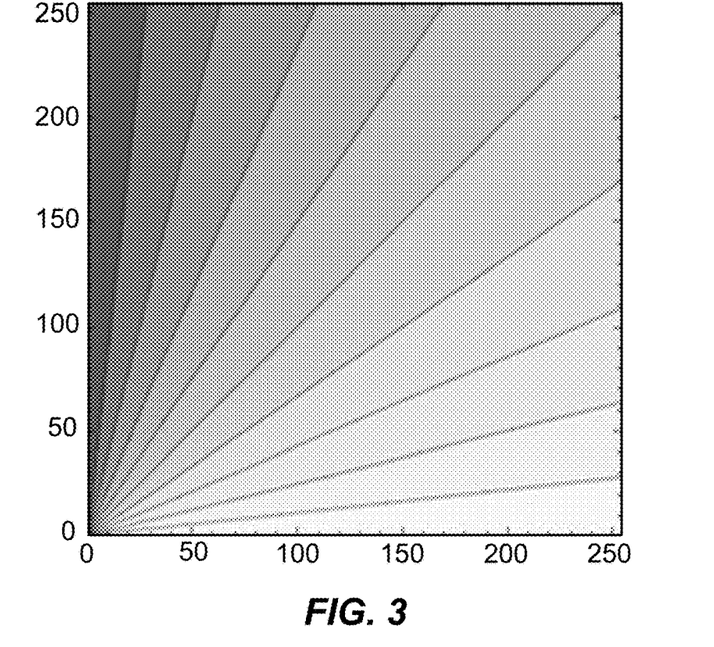
FIG. 3 illustrates a dynamic range of scores of the conventional NPD technique.

In short, the conventional NPD is unable to distinguish pixel differences whenever one of the pixels is dark (e.g., near 0). This is shown in FIG. 3 which is a representation of the dynamic range of NPD scores in which different shaded regions represent the same or similar NPD score based on the x and y pixel values. It is seen that when the x pixel value is near 0, the resulting NPD score is near or at the minimum −1.0 (dark shading) no matter the y pixel value. Similarly, when the y pixel value is near 0, the resulting NPD score is near the maximum 1.0 (light shading) no matter the x pixel value.

Such inability to distinguish pixel differences is also demonstrated with the following examples:

f(10,1)=0.82;
f(128,1)=0.98;
f(192,1)=0.99;
f(255,1)=0.99.

As seen, the NPD score of 0.98 (resulting from a pixel difference of 127 (128-1)) is barely differentiated from the NPD score of 0.99 (resulting from a pixel difference of 254 (255-1)).

A further limitation of the conventional NPD is that it has contrast inconsistencies. As an illustration, assume the following. In a first image, the pixel values range from 100 to 200 (e.g., $P_{max}$=200, $P_{min}$=100), and in a second image, the pixel values range from 0 to 200 (e.g., e.g., $P_{max}$=200, $P_{min}$=0)). That is the contrast range of the first and second images are 100 (200-100) and 200 (200-0), respectively. Also assume that the pixels values of pixels x and y are 175 and 125 respectively for both images. Then the pixel difference term x−y=50 represents 50% of the contrast in the first image, but only represents 25% of the contrast in the second image because of the wider pixel range. And yet, an identical NPD score f(x, y)=0.1667 is produced for both images.

To address some or all of the issues of the conventional NPD, a contrast-adaptive NPD (CA-NPD) is proposed. In one aspect, the CA-NPD technique may be expressed by the following equation:

$$f(x, y) = \frac{x-y}{\max(k, x+y)} \quad (2)$$

In equation (2), max(k, x+y) is the normalization term in which k represents a normalization floor threshold, and x and y represent pixel values of first and second pixels of an image, respectively. The sum of the first and second pixel values x+y may be referred to as the pixel sum term. Thus, the normalization term in equation (2) may be the maximum of the normalization floor threshold k and the pixel sum term x+y. As seen, the NPD score may be arrived at by dividing the pixel difference term x−y by the normalization term max(k, x+y).

Figure 4:
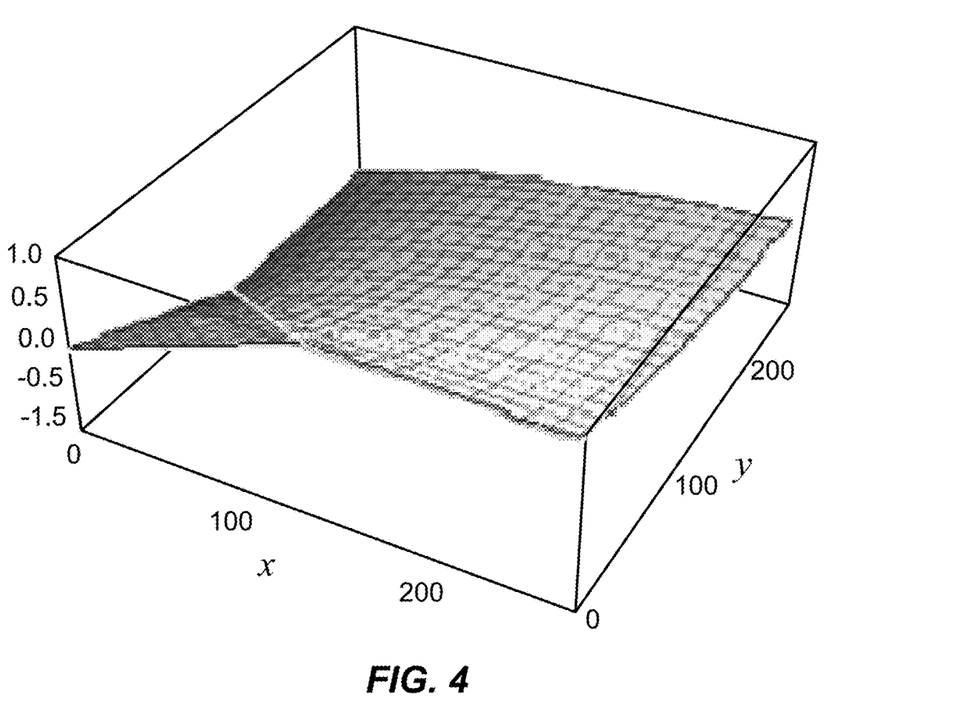
FIGS. 4 and 5 illustrate scoring surfaces associated with examples of a proposed contrast-adaptive normalized pixel difference (CA-NPD) technique based on a normalization floor threshold.
Figure 5:
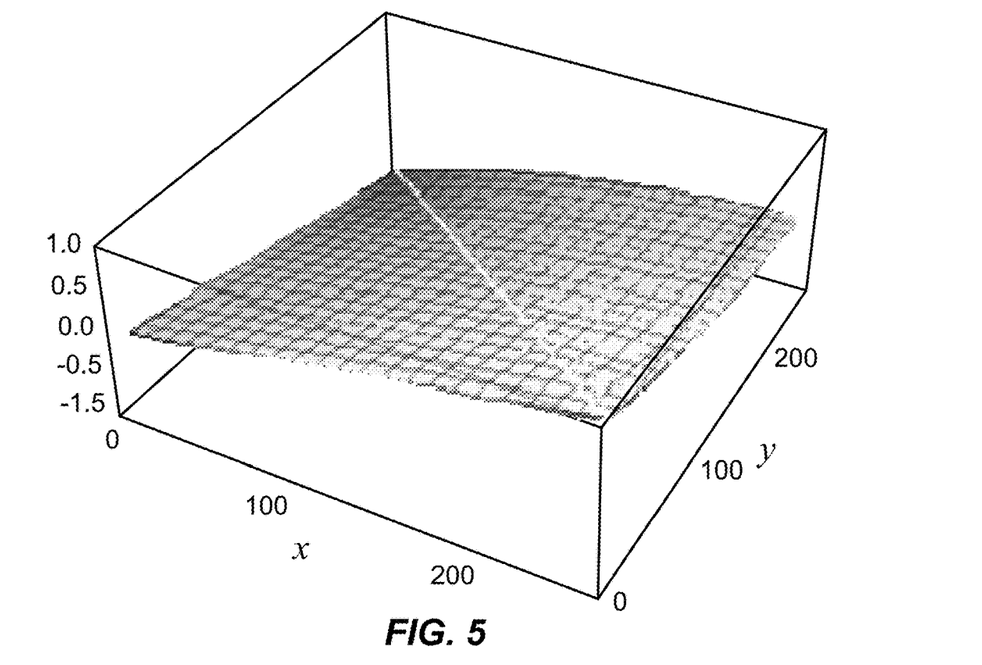

One desirable characteristic of the normalization floor threshold k is that the discontinuity that is present in the conventional NPD has now been replaced with a smooth metric surface. FIGS. 4 and 5 illustrate scoring surfaces associated with an aspect of the CA-NPD when the normalization floor threshold k are set to 128 and 256, respectively.

TABLE 2

| Conventional NPD | CA-NPD | |
|---|---|---|
| | k = 128 | k = 256 |
| f(0,0) = 0 | f(0,0) = 0 | f(0,0) = 0 |
| f(1,0) = 1 | f(1,0) = 0.008 | f(1,0) = 0.004 |
| f(0,1) = −1 | f(0,1) = −0.008 | f(0,1) = −0.004 |
| f(0,128) = −1 | f(0,128) = −1 | f(0,128) = −0.5 |

As seen in Table 2, small pixel differences lead to small NPD scores with the CA-NPD due to the normalization floor threshold k, which is unlike the conventional NPD. With the proposed CA-NPD, neighboring pixels will score similarly throughout. Compared with FIG. 2, it is seen that the scoring surfaces of FIGS. 4 and 5 are smooth and continuous.

In an aspect, it is proposed to adapt the normalization floor threshold k to the image. That is, the normalization floor threshold k may be determined based on the characteristics of the image of interest such as the dynamic range of the image. For example, the normalization floor threshold k may be set as follows:

$$k = P_{min} + j_{dr}(P_{max} - P_{min}) \quad (3)$$

In equation (3), $P_{min}$ and $P_{max}$ respectively represent minimum and maximum pixel values in the image, and $j_{dr}$ represents a dynamic range scale factor (e.g., between 0.0 and 1.0). As an example, if the dynamic range scale factor $j_{dr}$=0.5, the normalization floor threshold k is set to be in the middle of the dynamic range, i.e., the middle between $P_{min}$ and $P_{max}$.

Alternatively or in addition thereto, the normalization floor threshold k may be determined based on a distribution of pixel values in the image, also referred to as an image pixel distribution. One purpose of adapting the normalization floor threshold k based on the image pixel distribution is to correlate the contrast bit-width to the dominant distribution. For example, if a majority or a plurality of pixels of an image are bright (or dark), then it would make sense to set the normalization floor threshold k to a correspondingly high (or low) value.

In an aspect, the normalization floor threshold k may be determined based on a mode, mean, and/or median of the image pixel distribution. For example, normalization floor threshold k may be set by scaling the mode, the mean, and/or the median of the image pixel distribution, i.e.:

$$k = j_{mode} * \text{mode} \quad (4),$$

$$k = j_{mean} * \text{mean} \quad (5),$$

$$k = j_{median} * \text{median} \quad (6)$$

In equations (4), (5), and (6), $j_{mode}$, $j_{mean}$, and $j_{median}$ are respectively mode, mean, and median scale factors. In other words, the normalization floor threshold k may be set by multiplying the mode, the mean, and/or the median of the image pixel distribution by the corresponding mode, mean, and median scale factors.

As an illustration, when $j_{mode}$=2 and the normalization floor threshold k is determined from equation (4), the contrast bid-width (e.g., the bid-width of the NPD score) may be devoted to represent the dominant distribution. As another illustration, when $j_{mean}$=2 and the normalization floor threshold k is determined from equation (5), the contrast bid-width may devote equal amount of bid-width to either side of the average pixel value. As a further illustration, when $j_{median}=2$ and the normalization floor threshold k is determined from equation (6), the contrast bid-width may devote equal amount of bid-width to either side of the median pixel value.

Figure 6:
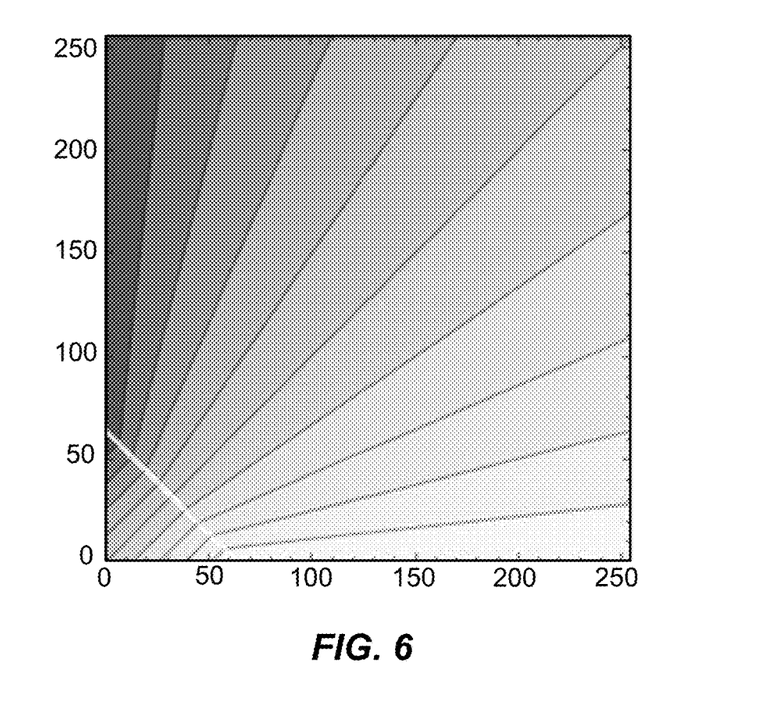
FIGS. 6 and 7 illustrate examples of dynamic ranges of scores of the proposed CA-NPD technique based on the normalization floor threshold.
Figure 7:
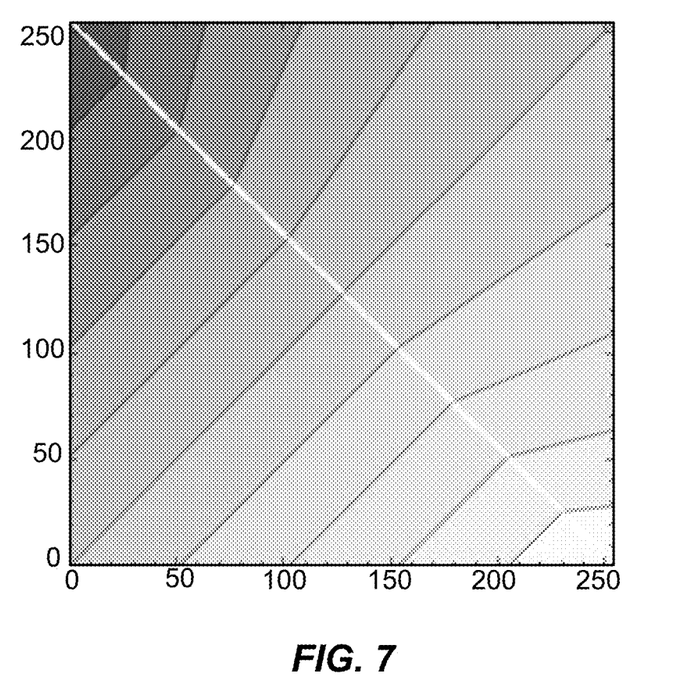

FIGS. 6 and 7 illustrate examples of dynamic ranges of scores of the proposed CA-NPD technique. The normalization floor threshold k is set to 64 and 256 respectively in FIGS. 6 and 7. Table 3 lists some examples of the NPD score with the normalization floor threshold k set to 64 and 256. It is seen that relative contrast discriminability is enhanced with the CA-NPD relative to the conventional NPD (e.g., compare FIGS. 6 and 7 with FIG. 2) due in large part to the use of the normalization floor threshold k.

TABLE 3

|  | CA-NPD | |
|---|---|---|
| Conventional NPD | k = 64 | k = 256 |
| f(10,1) = 0.82 | f(10,1) = 0.14 | f(10,1) = 0.04 |
| f(32,1) = 0.94 | f(32,1) = 0.48 | f(32,1) = 0.25 |
| f(128,1) = 0.98 | f(128,1) = 0.98 | f(128,1) = 0.50 |
| f(192,1) = 0.99 | f(192,1) = 0.99 | f(192,1) = 0.75 |
| f(255,1) = 0.99 | f(255,1) = 0.99 | f(255,1) = 0.99 |

In a different aspect, the CA-NPD technique may be expressed by the following equation:

$$f(x, y) = \frac{x - y}{M(x, y)} \quad (7)$$

In equation (7), M(x,y) is the normalization term, and may be said to represent a distribution of pixel values in a pixel region of an image that encompasses the pixels x and y, i.e., encompasses the first and second pixels. This distribution of pixel values may also be referred to as the regional pixel distribution. The NPD score in equation (7) may be computed at by dividing the pixel difference term x−y by the regional pixel distribution M(x, y) serving as the normalization term.

Figure 8:
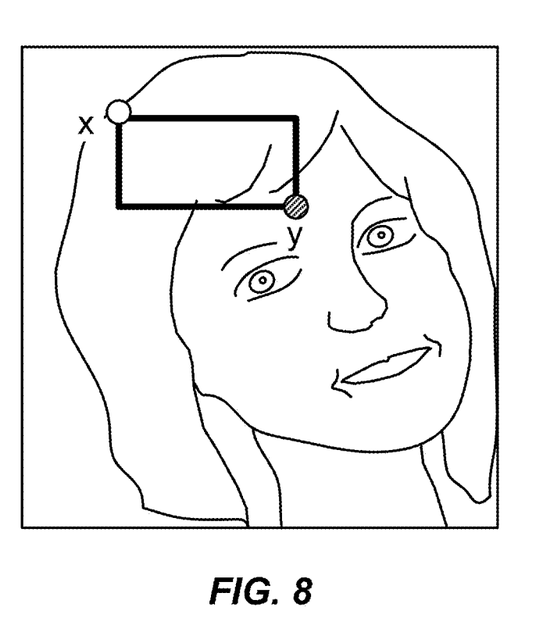
FIG. 8 illustrates an example of the proposed CA-NPD technique using a pixel region.

The pixel region may also encompass other pixels in addition to the first and second pixels. For example, the pixel region may be a contiguous region, such as a rectangle, that includes the first and second pixels. As seen in FIG. 8, the first and second pixels x and y may define opposite corners of the rectangular pixel region.

In an aspect, the regional pixel distribution M(x,y) may be viewed as representing a context or mid-point of an energy distribution (pixel value distribution) within the pixel region. As such, the regional pixel distribution M(x,y) can be a form of divisive normalization which distributes the contrast bid-widths based on local characteristics of the pixel region (i.e., characteristics of the image patch). By relying on a region instead of two pixels for normalization, robustness can be improved.

Figure 9:
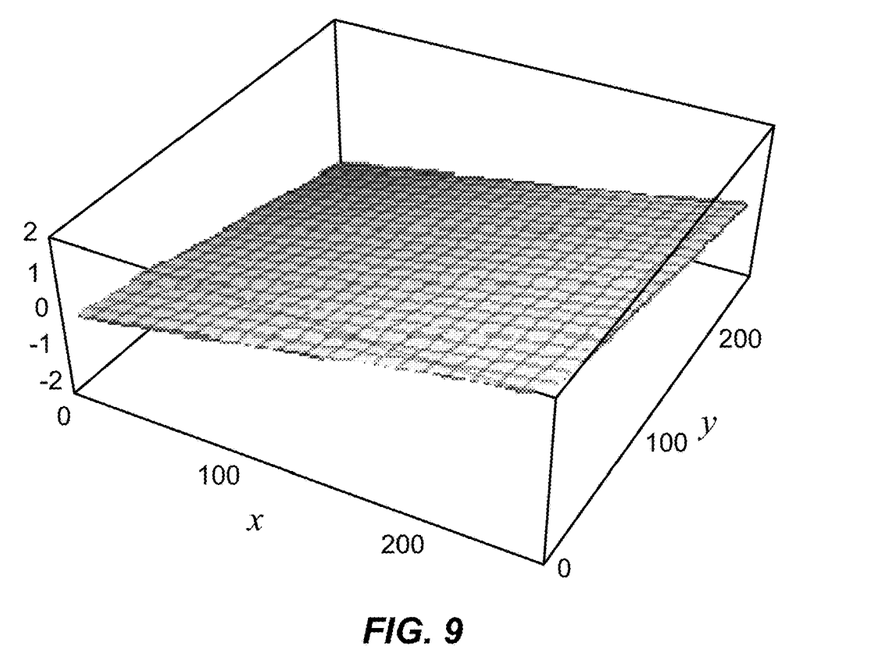
FIG. 9 illustrates a scoring surface associated with an example of the proposed contrast-adaptive normalized pixel difference (CA-NPD) technique based on the pixel region.
Figure 10:
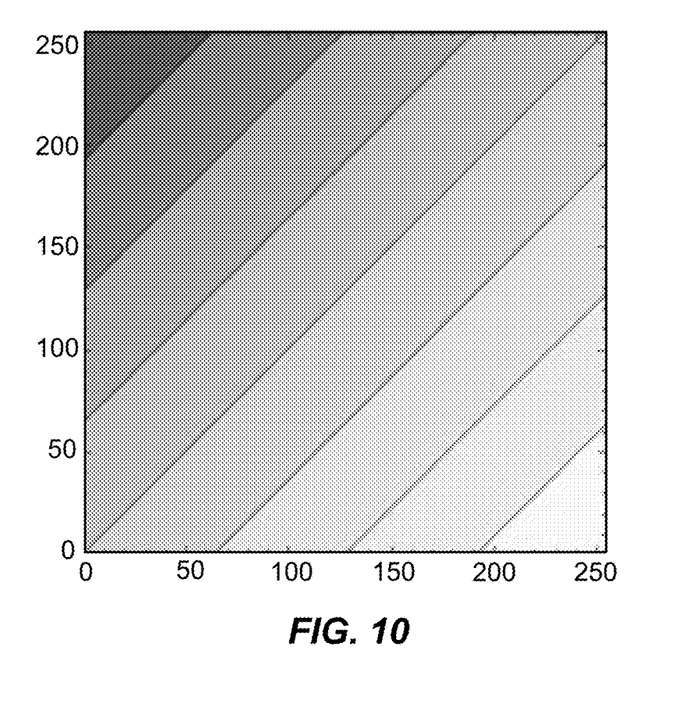
FIG. 10 illustrates an example of a dynamic range of scores of the proposed CA-NPD technique based on the pixel region.

This is shown in FIGS. 9 and 10. FIG. 9 illustrates a scoring surface associated with an example of the proposed CA-NPD based on the pixel region, and FIG. 10 illustrates an example of a dynamic range of scores of the CA-NPD technique based on the pixel region. Note that the use of the pixel region in determining the NPD score f(x,y) results in a very smooth metric surface (FIG. 9) and enhanced contrast discriminability (FIG. 10).

As mentioned, the regional pixel distribution M(x, y) may be determined based on the local characteristics of the pixel region such as the dynamic range of the pixel region. For example, the regional pixel distribution M(x, y) may be set as follows:

$$M(x,y)=P_{min,pr}+j_{dr,pr}(P_{max,pr}-P_{min,pr}) \quad (8)$$

In equation (8), $P_{min,pr}$ and $P_{max,pr}$ respectively represent minimum and maximum pixel values in the pixel region, and $j_{dr,pr}$ represents a pixel region dynamic range scale factor (e.g., between 0.0 and 1.0). As an example, if the scale factor $j_{dr,pr}=0.5$, the regional pixel distribution M(x,y) is set to be in the middle of the dynamic range, i.e., the middle between $P_{min,pr}$ and $P_{max,pr}$.

Alternatively or in addition thereto, the regional pixel distribution M(x, y) may be determined based on a distribution of pixel values in the pixel region. For example, the regional pixel distribution M(x,y) may be determined based on the mode, mean, and/or the median of the distribution.

For example, the regional pixel distribution M(x,y) may be determined as the mean of the pixel values in the pixel region, i.e.:

$$M(x, y) = \frac{\Sigma \text{ pixel values in pixel region}}{\# \text{ of pixel values in pixel region}} \quad (9)$$

However, it is envisioned that the CA-NPD will be implemented in a low complexity device with limited processing capabilities such as in low power devices. In such an environment, actually performing the division operation to determine the regional pixel distribution M(x, y) may be expensive or even prohibitive.

To address this issue, it is proposed to perform division by bit shifting the sum of the pixel values in the pixel region. That is, if the number of pixel values in the pixel region (denominator of equation (9)) is n, then the sum of the pixel values (numerator in equation (9)) may be shifted by m bits such that $2^m-n$ is minimized. For example, if n=34, then the sum may be shifted by five bits, i.e., m=5 since $2^5=32$. While this may not yield exactly accurate results, the reduction in the complexity can be very significant while providing sufficient accuracy.

Alternatively, when the first and second pixels x and y are selected, the pixel region may be chosen such that the number of pixels in the pixel region is exactly equal to $2^m$. For example, pixels adjacent to a region defined by the first and second pixels x and y may be included in the chosen pixel region.

It should be noted that the concept of performing division by bit shifting may also be applied in some aspects to determining the NPD score f(x, y) as well.

In yet another different aspect, the CA-NPD may combine equations (2) and (7), i.e., combine the normalization floor threshold k and the regional pixel distribution M(x, y) expressed as follows:

$$f(x, y) = \frac{x - y}{\max(k, M(x, y))} \quad (10)$$

Implementation of equation (10) is relatively straightforward from the descriptions provided above with respect to equations (2) and (7).

Figure 11:
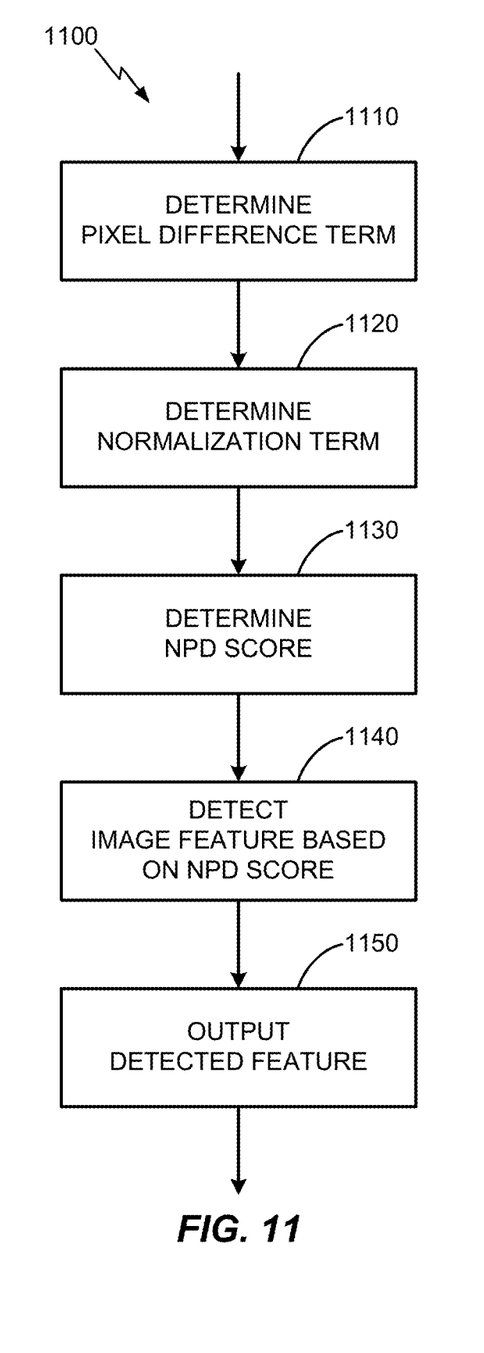
FIG. 11 illustrates a flow chart of an example method performed by an apparatus to implement the proposed CA-NPD technique.

FIG. 11 illustrates a flow chart of an example method 1100 performed by an apparatus to implement the proposed CA-NPD technique. At block 1110, the apparatus may determine the pixel difference term x−y based on first and second pixels of an image. At block 1120, the apparatus may determine the normalization term.

Figure 12:
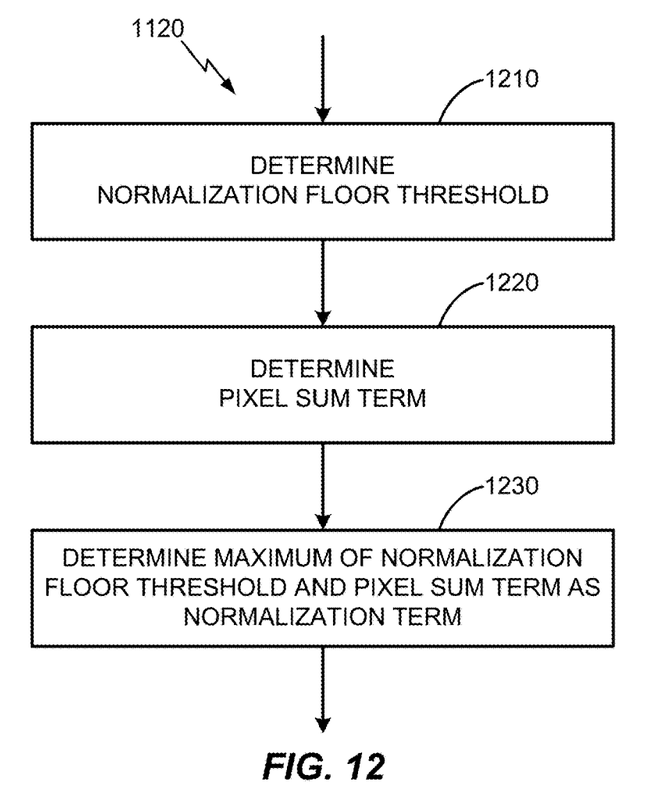
FIGS. 12, 13, and 14 illustrate flow charts of example processes to determine a normalization term of the proposed CA-NPD technique.

FIG. 12 illustrates a flow chart of an example process to perform block 1120. At block 1210, the apparatus may determine the normalization floor threshold k. As indicated above, the normalization floor threshold k may be determined based on a dynamic range of the image. Alternatively or in addition thereto, the normalization floor threshold k may be determined based on the image pixel distribution (e.g., mode, mean, and/or median). At block 1220, the apparatus may determine the pixel sum term x+y. At block 1230, the apparatus may determine the normalization term as a maximum of the normalization floor threshold k and the pixel sum term x+y.

Figure 13:
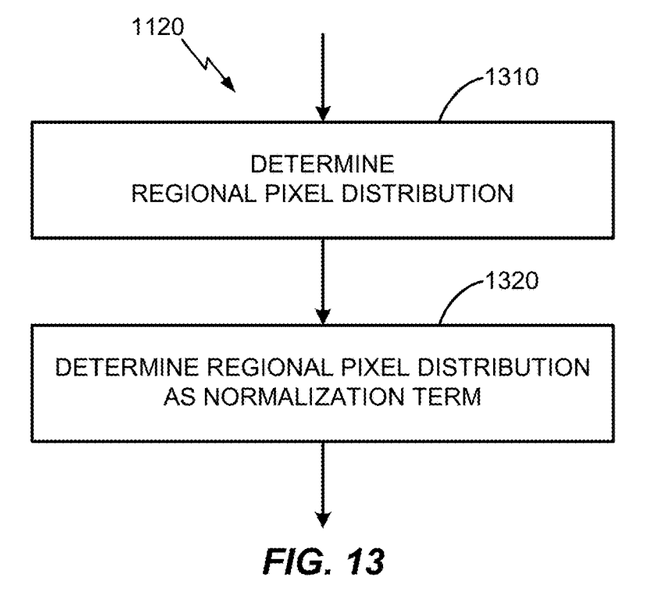

FIG. 13 illustrates a flow chart of another example process to perform block 1120. At block 1310, the apparatus may determine the regional pixel distribution M(x, y) of a pixel region of the image. The pixel region may encompass the first and second pixels. As indicated above, the regional pixel distribution M(x,y) may be determined based on a dynamic range of the pixel region. Alternatively or in addition thereto, the regional pixel distribution M(x, y) may be determined based on a distribution of the pixel values in the pixel region. At block 1320, the apparatus may determine the regional pixel distribution M(x, y) as the normalization term.

Figure 14:
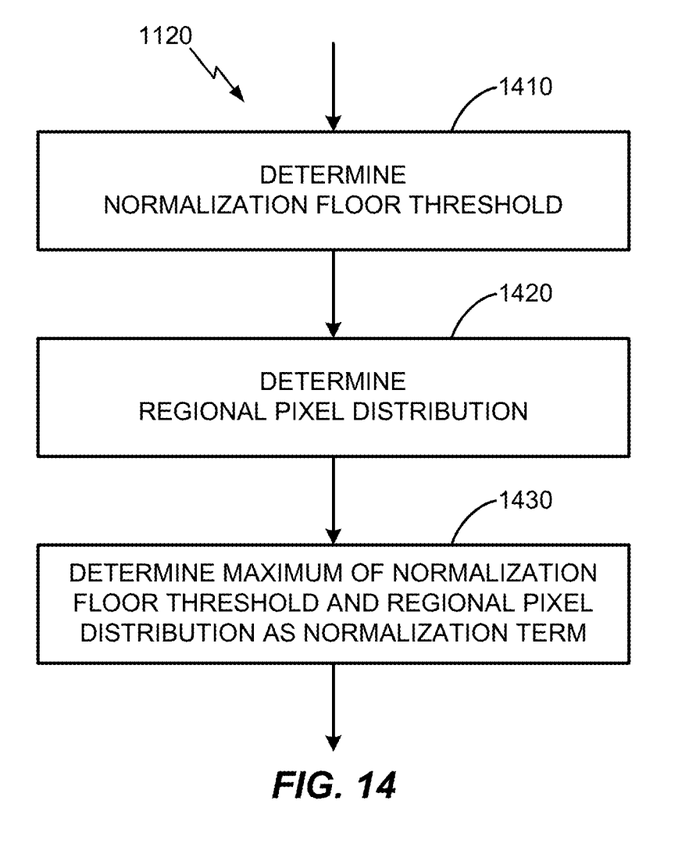

FIG. 14 illustrates a flow chart of a further example process to perform block 1120. At block 1410, the apparatus may determine the normalization floor threshold k. Block 1410 may be similar to block 1210. At block 1420, the apparatus may determine the regional pixel distribution M(x, y). Block 1420 may be similar to block 1310. At block 1430, the apparatus may determine the normalization term as a maximum of the normalization floor threshold k and the regional pixel distribution M(x, y).

Referring back to FIG. 11, at block 1130, the apparatus may determine the NPD score f(x, y), e.g., by dividing the pixel difference term by the normalization term. At block 1140, the apparatus may detect a feature of the image based on the NPD score. At block 1150, the apparatus may output the detected feature. For example, the processed image may be outputted to a display. In another example, the detected feature may be outputted for further processing. In yet another example, the detected features may be outputted to storage. It should be noted that not all illustrated blocks of FIGS. 11-14 need be performed, i.e., some blocks may be optional. Also, the numerical references to the blocks in these figures should not be taken as requiring that the blocks should be performed in a certain order. Indeed, some blocks may be performed concurrently.

Figure 15:
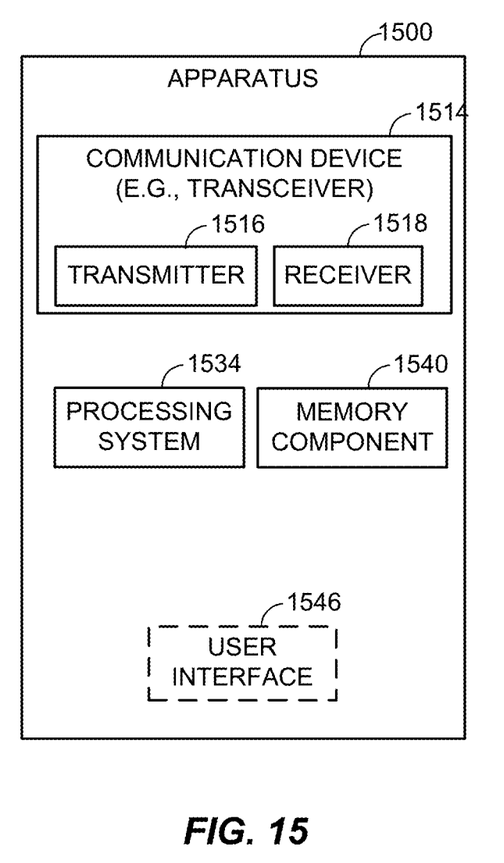
FIG. 15 illustrates an example apparatus configured to implement the proposed CA-NPD technique.

FIG. 15 illustrates several sample components an apparatus 1500 to support the operations as disclosed herein. It will be appreciated that the components may be implemented in different types of apparatuses in different implementations (e.g., in an ASIC, in SOC (System-on-Chip), etc.). The illustrated components may also be incorporated into other apparatuses such as in a computer system.

The apparatus 1500 may include a communication device 1514. The communication device 1514 may at least one transmitter 1516 for transmitting signals ((e.g., messages, indications, information, and so on) and at least one receiver for receiving signals (e.g., messages, indications, information, and so on). The transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations.

The apparatus 1500 may also include other components that may be used in conjunction with the operations as disclosed herein. The apparatus 1500 may include a processing system 1534 for providing processing functionality. In an aspect, the processing system 1534 may include, for example, one or more general purpose processors, multi-core processors, ASICs, DSPs (digital signal processor), FGPAs (field programmable gate array), or other programmable logic devices or processing circuitry.

The apparatus 1500 may further include memory component 1540 (e.g., each including a memory device) for maintaining information (e.g., information indicative of reserved resources, thresholds, parameters, and so on). In addition, the apparatus 1500 may include a user interface device 1546 for providing indications (e.g., audible and/or visual indications) to a user and/or for receiving user input (e.g., upon user actuation of a sensing device such a keypad, a touch screen, a microphone, and so on). For convenience, the apparatus 1500 is shown in FIG. 15 as including various components that may be configured according to the various examples described herein. It will be appreciated, however, that the illustrated blocks may have different functionality in different designs.

The components of FIG. 15 may be implemented in various ways. In some implementations, the components of FIG. 15 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 1514, 1534, 1540, and 1546 may be implemented by processor and memory component(s) of the apparatus 1500 (e.g., by execution of appropriate code and/or by appropriate configuration of processor components).

Figure 16:
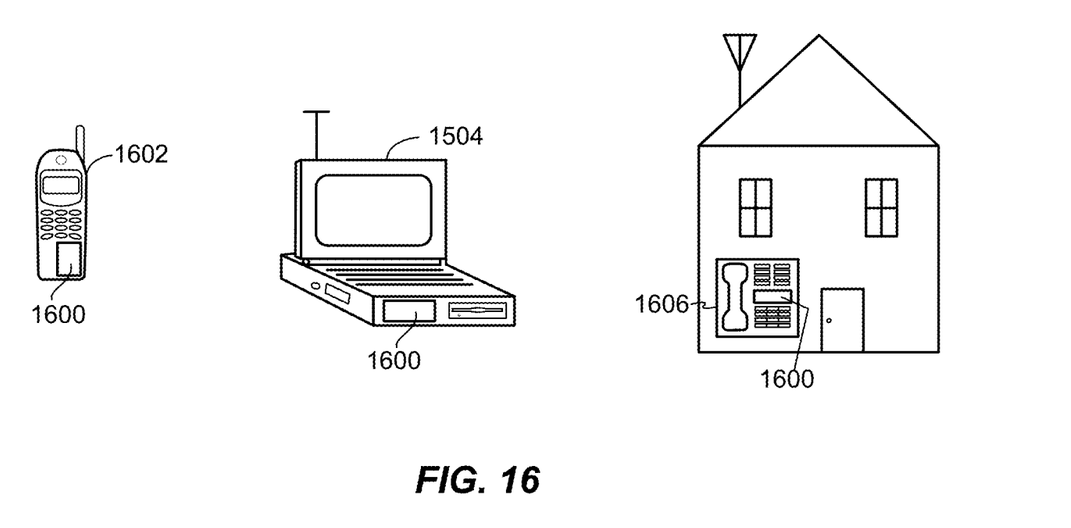
FIG. 16 illustrates examples of devices with an apparatus integrated therein.

FIG. 16 illustrates various electronic devices that may be integrated with the aforementioned apparatus. For example, a mobile phone device 1602, a laptop computer device 1604, a terminal device 1606 as well as security devices that incorporate the apparatus described herein may include an apparatus 1600. The apparatus 1600 may also be a standalone device, such as a sensor, a fixed sensor, an IoT (Internet of Things) device, etc. The devices 1602, 1604, 1606 illustrated in FIG. 16 are merely exemplary. Other electronic devices may also feature the apparatus 1600 including, but not limited to, a group of devices (e.g., electronic devices) that includes security devices, mobile devices, hand-held personal communication systems (PCS) units, portable data units such as personal digital assistants, global positioning system (GPS) enabled devices, navigation devices, set top boxes, music players, video players, entertainment units, communications devices, smartphones, tablet computers, computers, wearable devices, servers, routers, electronic devices implemented in automotive vehicles (e.g., autonomous vehicles), or any combination thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method, comprising:
   determining a pixel difference term based on first and second pixels of an image;
   determining a normalization term based on the first and second pixels;
   determining a normalized pixel difference (NPD) score by dividing the pixel difference term by the normalization term;
   detecting a feature of the image based on the NPD score; and
   outputting the detected feature of the image,
   wherein the normalization term comprises one or both of:
      a normalization floor threshold such that the normalization term is equal to or greater than the normalization floor threshold, and
      a regional pixel distribution representing a distribution of pixel values in a pixel region of the image, the pixel region encompassing the first and second pixels.

2. The method of claim 1, wherein determining the normalization term comprises:
   determining the normalization floor threshold;
   determining a pixel sum term representing a sum of pixel values of the first and second pixels; and
   determining as the normalization term a maximum of the normalization floor threshold and the pixel sum term.

3. The method of claim 2, wherein the normalization floor threshold is determined based on a dynamic range of the image.

4. The method of claim 2, wherein the normalization floor threshold is determined based on an image pixel distribution representing a distribution of pixel values in the image.

5. The method of claim 4, wherein the normalization floor threshold is determined based on any one or more of a mode, a mean, and a median of the image pixel distribution.

6. The method of claim 5,
   wherein when the normalization floor threshold is based on the mode of the image pixel distribution, the normalization floor threshold is determined by multiplying the mode of the image pixel distribution by a mode scale factor, wherein when the normalization floor threshold is based on the mean of the image pixel distribution, the normalization floor threshold is determined by multiplying the mean of the image pixel distribution by a mean scale factor, and wherein when the normalization floor threshold is based on the median of the image pixel distribution, the normalization floor threshold is determined by multiplying the median of the image pixel distribution by a median scale factor.

7. The method of claim 1, wherein determining the normalization term comprises:

determining as the normalization term the regional pixel distribution of a pixel region, wherein the pixel region also encompasses one or more other pixels of the image in addition to the first and second pixels.

8. The method of claim 7, wherein the pixel region encompasses a contiguous region of the image that includes the first and second pixels.

9. The method of claim 7, wherein the regional pixel distribution is determined based on a dynamic range of the pixel region.

10. The method of claim 7, wherein the regional pixel distribution represents any one or more of a mode, a mean, or a median of pixel values in the pixel region.

11. The method of claim 10, wherein the regional pixel distribution represents the mean of the pixel values in the pixel region, and wherein determining the regional pixel distribution of the pixel region comprises:

summing the pixel values of pixels in the pixel region; and determining the regional pixel distribution by bit shifting the sum of the pixel values by m bits such that $2^m - n$ is minimized in which n represents a number of pixels in the pixel region.

12. The method of claim 1, wherein determining the normalization term comprises:

determining the normalization floor threshold;

determining the regional pixel distribution of the pixel region encompassing the first and second pixels and one or more other pixels; and determining as the normalization term a maximum of the normalization floor threshold and the regional pixel distribution.

13. The method of claim 12, wherein the normalization floor threshold is determined based on one or both of a dynamic range of the image, and an image pixel distribution representing a distribution of pixel values in the image.

14. The method of claim 12, wherein the regional pixel distribution is determined based on one or both of a dynamic range of the pixel region, and a distribution of the pixel values in the pixel region.

15. An apparatus, comprising:

a memory circuitry; and a processor circuitry, wherein the memory circuitry and the processor circuitry are configured to:

determine a pixel difference term based on first and second pixels of an image;

determine a normalization term based on the first and second pixels;

determine a normalized pixel difference (NPD) score by dividing the pixel difference term by the normalization term;

detect a feature of the image based on the NPD score; and output the detected feature of the image, wherein the normalization term comprises one or both of:

a normalization floor threshold such that the normalization term is equal to or greater than the normalization floor threshold, and a regional pixel distribution representing a distribution of pixel values in a pixel region of the image, the pixel region encompassing the first and second pixels.

16. The apparatus of claim 15, wherein the memory circuitry and the processor circuitry are configured to:

determine the normalization floor threshold;

determine a nominal normalization term as a sum of pixel values of the first and second pixels; and determine as the normalization term a maximum of the normalization floor threshold and the nominal normalization term.

17. The apparatus of claim 16, wherein the normalization floor threshold is determined based on a dynamic range of the image.

18. The apparatus of claim 16, wherein the normalization floor threshold is determined based on an image pixel distribution representing a distribution of pixel values in the image.

19. The apparatus of claim 18, wherein the normalization floor threshold is determined based on any one or more of a mode, a mean, and a median of the image pixel distribution.

20. The apparatus of claim 19, wherein when the normalization floor threshold is based on the mode of the image pixel distribution, the memory circuitry and the processor circuitry are configured to multiply the mode of the image pixel distribution by a mode scale factor to determine the normalization floor threshold, wherein when the normalization floor threshold is based on the mean of the image pixel distribution, the memory circuitry and the processor circuitry are configured to multiply the mean of the image pixel distribution by a mean scale factor to determine the normalization floor threshold, and wherein when the normalization floor threshold is based on the median of the image pixel distribution, the memory circuitry and the processor circuitry are configured to multiply the median of the image pixel distribution by a median scale factor to determine the normalization floor threshold.

21. The apparatus of claim 15, wherein the memory circuitry and the processor circuitry are configured to determine as the normalization term the regional pixel distribution of the pixel region, the pixel region also encompassing one or more other pixels of the image in addition to the first and second pixels.

22. The apparatus of claim 21, wherein the pixel region encompasses a contiguous region of the image that includes the first and second pixels.

23. The apparatus of claim 21, wherein the regional pixel distribution is determined based on a dynamic range of the pixel region.

24. The apparatus of claim 21, wherein the regional pixel distribution represents any one or more of a mode, a mean, or a median of pixel values in the pixel region.

25. The apparatus of claim 24, wherein the regional pixel distribution represents the mean of the pixel values in the pixel region, and wherein the memory circuitry and the processor circuitry are configured to:
sum the pixel values of pixels in the pixel region; and
determine the regional pixel distribution by bit shifting the sum of the pixel values by m bits such that $2^m-n$ is minimized in which n represents a number of pixels in the pixel region.

26. The apparatus of claim 15, wherein the memory circuitry and the processor circuitry are configured to:
determine the normalization floor threshold;
determine the regional pixel distribution of the pixel region encompassing the first and second pixels and one or more other pixels; and
determine as the normalization term a maximum of the normalization floor threshold and the regional pixel distribution.

27. The apparatus of claim 26, wherein the memory circuitry and the processor circuitry are configured to determine the normalization floor threshold based on one or both of a dynamic range of the image, and an image pixel distribution representing a distribution of pixel values in the image.

28. The apparatus of claim 26, wherein the memory circuitry and the processor circuitry are configured to determine the regional pixel distribution based on one or both of a dynamic range of the pixel region, and a distribution of the pixel values in the pixel region.

29. An apparatus, comprising:
means for determining a pixel difference term based on first and second pixels of an image;
means for determining a normalization term based on the first and second pixels;
means for determining a normalized pixel difference (NPD) score by dividing the pixel difference term by the normalization term
means for detecting a feature of the image based on the NPD score; and
means for outputting the detected feature of the image,
wherein the normalization term comprises one or both of:
a normalization floor threshold such that the normalization term is equal to or greater than the normalization floor threshold, and
a regional pixel distribution representing a distribution of pixel values in a pixel region of the image, the pixel region encompassing the first and second pixels.

30. A non-transitory computer-readable medium storing computer-executable instructions for an apparatus, the computer-executable instructions comprising:
one or more instructions causing the apparatus to determine a pixel difference term based on first and second pixels of an image;
one or more instructions causing the apparatus to determine a normalization term based on the first and second pixels;
one or more instructions causing the apparatus to determine a normalized pixel difference (NPD) score by dividing the pixel difference term by the normalization term;
one or more instructions causing the apparatus to detect a feature of the image based on the NPD score; and
one or more instructions causing the apparatus to output the detected feature of the image,
wherein the normalization term comprises one or both of:
a normalization floor threshold such that the normalization term is equal to or greater than the normalization floor threshold, and
a regional pixel distribution representing a distribution of pixel values in a pixel region of the image, the pixel region encompassing the first and second pixels.

* * * * *